US008140445B2

(12) United States Patent  
Meng

(10) Patent No.: US 8,140,445 B2  
(45) Date of Patent: Mar. 20, 2012

(54) FUZZY RULE HANDLING

(75) Inventor: Zhuo Meng, Broadview Heights, OH (US)

(73) Assignee: CA, Inc., Islandia, NY (US)

( * ) Notice: Subject to any disclaimer, the term of this patent is extended or adjusted under 35 U.S.C. 154(b) by 943 days.

(21) Appl. No.: 12/123,527

(22) Filed: May 20, 2008

(65) Prior Publication Data

US 2009/0292663 A1 Nov. 26, 2009

(51) Int. Cl.
 G06F 15/18 (2006.01)
(52) U.S. Cl. ............................................ 706/1; 717/143
(58) Field of Classification Search ................ 706/1, 47; 707/780
 See application file for complete search history.

(56) References Cited

U.S. PATENT DOCUMENTS

| | | | | |
|---|---|---|---|---|
| 4,924,408 | A * | 5/1990 | Highland | 706/60 |
| 5,204,939 | A * | 4/1993 | Yamazaki et al. | 706/50 |
| 5,822,740 | A * | 10/1998 | Haissig et al. | 706/3 |
| 7,136,843 | B2 | 11/2006 | Bigus et al. | |
| 7,818,311 | B2 * | 10/2010 | Michailov | 707/708 |
| 8,005,848 | B2 * | 8/2011 | Champion et al. | 707/755 |
| 2008/0005054 | A1 | 1/2008 | Kurian | |
| 2009/0292663 | A1 * | 11/2009 | Meng | 706/47 |

FOREIGN PATENT DOCUMENTS

WO WO-0072183 A2 11/2000

OTHER PUBLICATIONS

Jose Galindo, Juan Miguel Medina, Olga Pons, and Juan C. Cubero. 1998. A Server for Fuzzy SQL Queries. In Proceedings of the Third International Conference on Flexible Query Answering Systems (FQAS 1998), Troels Andreasen, Henning Christiansen, and Henrik Legind Larsen (Eds.). Springer-Verlag, London, UK, 164-174.*

Jenny Menolascina, Jose Aguilar-Castro, Francklin Rivas-Echeverría. Compiler design for Fuzzy Classifier Systems. Proceedings of the 6th WSEAS Int. Conf. on Fuzzy Systems, Lisbon, Portugal, Jun. 16-18, 2005 (pp. 23-28).*

"InfoSapient", [online]. (c) 2001, Workplace Performance Tools. [retrieved Jan. 24, 2008]. Retrieved from the Internet: <URL: http://info-sapient.sourceforge.net/>,(2001),2 pgs.

"White Paper: The Representation and Execution of Business Operation Rules", (c) 2001, Workplace Performance Tools,(2001),29 pgs.

Chan, H. , et al., "Approach to Policy Execution in Autonomic Manager Toolkit", *Proceedings of ACM Workshop on Algorithms and Architectures for Self-Managing Systems*, [online]. Retrieved from the Internet: <http://www.research.ibm.com/people/a/agrawal/publications/approach-to-policy-execution.pdf>,(Jun. 2003),2 pgs.

* cited by examiner

*Primary Examiner* — Jeffrey A Gaffin  
*Assistant Examiner* — David H Kim  
(74) *Attorney, Agent, or Firm* — Schwegman, Lundberg & Woessner, P.A.

(57) ABSTRACT

A method to add expression level fuzzy rule processing capability to existing crisp rule engine without requiring extensive modifications to such rule engine. A system and computer implemented method receive a data set at a crisp rule engine. If the data set involves a fuzzy rule, a callback to a fuzzy rule broker is done. The fuzzy rule broker selects one of multiple tailored processing modules for processing the fuzzy rule. The result of processing the fuzzy rule may be converted to a crisp result and returned to the crisp rule engine.

19 Claims, 3 Drawing Sheets

FUZZY RULE HANDLING

BACKGROUND

Rule engines are computer programs that are used to provide information given an input. The input is processed by one or more rules. Many rule engines require crisp rules in which preconditions consist of crisp tests, for example, dog.age>8 years. The use of such crisp rules may limit the applicability of the rule engines to situations where the logic involve fuzzy concepts such as the dog is old. Modification of a rule engine to support fuzzy rules can be very complex and error prone.

SUMMARY

In various embodiments fuzzy rule handling capability may be added to existing crisp rule engine at the expression level while minimizing changes to the existing crisp rule engine. A computer implemented method receives a data set at a crisp rule engine. If the data set involves a fuzzy rule, a callback to a fuzzy rule broker is done. The fuzzy rule broker selects one of multiple tailored processing modules for processing the fuzzy rule.

In one embodiment, a computer implemented method includes providing a set of rules having at least one fuzzy expression to a compiler for a crisp inferencing engine. The at least one fuzzy expression may be bracketed between a pair of markers. While compiling the set of rules, the fuzzy expression is recognized and a generic fuzzy expression operation code is generated corresponding to the fuzzy expression. Compiled code for non fuzzy expressions is generated to create a compiled version of the set of rules.

A system includes multiple tailored processing modules that process selected fuzzy expressions. A fuzzy expression broker routes fuzzy expressions to the multiple tailored processing modules. A crisp inferencing engine generates callbacks to the fuzzy expression broker in response to encountering a fuzzy expression when executing crisp rules intermixed with fuzzy expressions.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Various embodiments are described where fuzzy rules are added to existing rule engines by deferring fuzzy expression interpretation. A callback may be used to defer the fuzzy expression interpretation such that the rule engine need not be extensively modified to accept and interpret fuzzy expressions. A crisp rule language may be extended to support fuzzy expressions. A special pair of markers, such as "~[" and "~]" may be used to enclose the fuzzy expressions when a user writes rules using the extended crisp rule language. A compiler for the rule engine then generates a generic fuzzy expression operation code for each fuzzy rule encountered, and records the fuzzy expression in a compiled output. To evaluate a fuzzy expression during operation of the rule engine, one or more tailored processing modules may be provided. When inferencing begins, crisp rules are evaluated in the rule engine, and when a fuzzy rule is encountered, a callback is generated for a broker, which routes processing of the fuzzy rule to one of the tailored processing modules.

Figure 1:
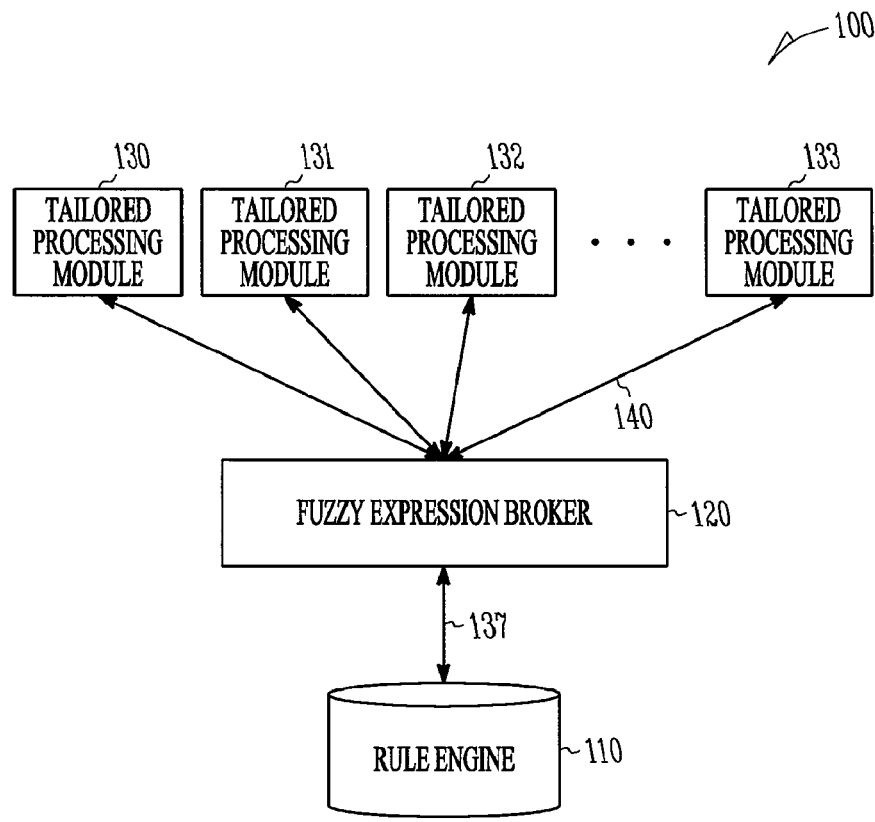
FIG. 1 is a block diagram of a system for processing data in accordance with both crisp and fuzzy rules according to an example embodiment.

FIG. 1 is a block diagram of a system 100 that includes a crisp inferencing engine, referred to as crisp rule engine 110. The crisp rule engine 110 is coupled to a fuzzy expression broker 120, which in turn is coupled to multiple tailored processing modules 130, 131, 132, 133 that process selected fuzzy expressions. The fuzzy expression broker 120 routes fuzzy expressions to the multiple tailored processing modules 130, 131, 132, 133. The crisp rule engine 110 generates callbacks 137 to the fuzzy expression broker in response to encountering a fuzzy expression when executing crisp rules intermixed with fuzzy expressions. The callback may include the fuzzy rule and the fuzzy expression broker 120 selects a tailored processing module as a function of the fuzzy rule.

In one embodiment, the fuzzy expression broker 120 is configured to receive results from the multiple tailored processing modules 130, 131, 132, 133 which would also be responsible for converting the results to crisp results upon request from the broker. The crisp results are then sent to the crisp rule engine 110. In a further embodiment, the crisp rule engine 110 is configured to process the crisp results with crisp rules to infer a final result. A cached link 140 may be created between the fuzzy expression broker 120 and one or more of the multiple tailored processing modules such as 133 to improve performance.

Figure 2:
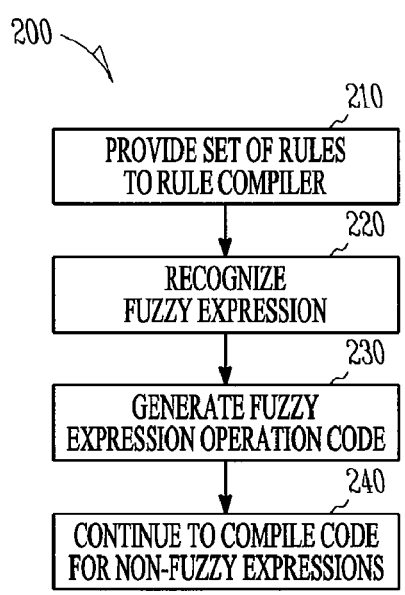
FIG. 2 is a flowchart illustrating a method of compiling rules for a crisp engine according to an example embodiment.

FIG. 2 is a computer implemented method 200 illustrating compilation of a set of rules. The rules may include at lest one fuzzy expression. At 210, a set of rules having at least one fuzzy expression is provided to a compiler for the crisp inferencing engine. The fuzzy expression may be bracketed between a pair of markers. While compiling the set of rules, the fuzzy expression is recognized at 220, and a generic fuzzy expression operation code corresponding to the fuzzy expression is generated at 230. Compiled code for non fuzzy expressions is generated at 240 to create a compiled version of the set of rules.

In one embodiment, the fuzzy expression operation code is generic for all fuzzy expressions. The operation code generates the callback to the fuzzy rule broker. The callback may include the fuzzy expression, which may be used to route the fuzzy expression to an appropriate processing module tailored to handle the particular fuzzy expression. In a further embodiment, code may be compiled to process an evaluated result received from the fuzzy rule broker. The evaluated result received from the fuzzy rule broker may be made crisp by the broker through a request to a tailored processing unit.

Figure 3:
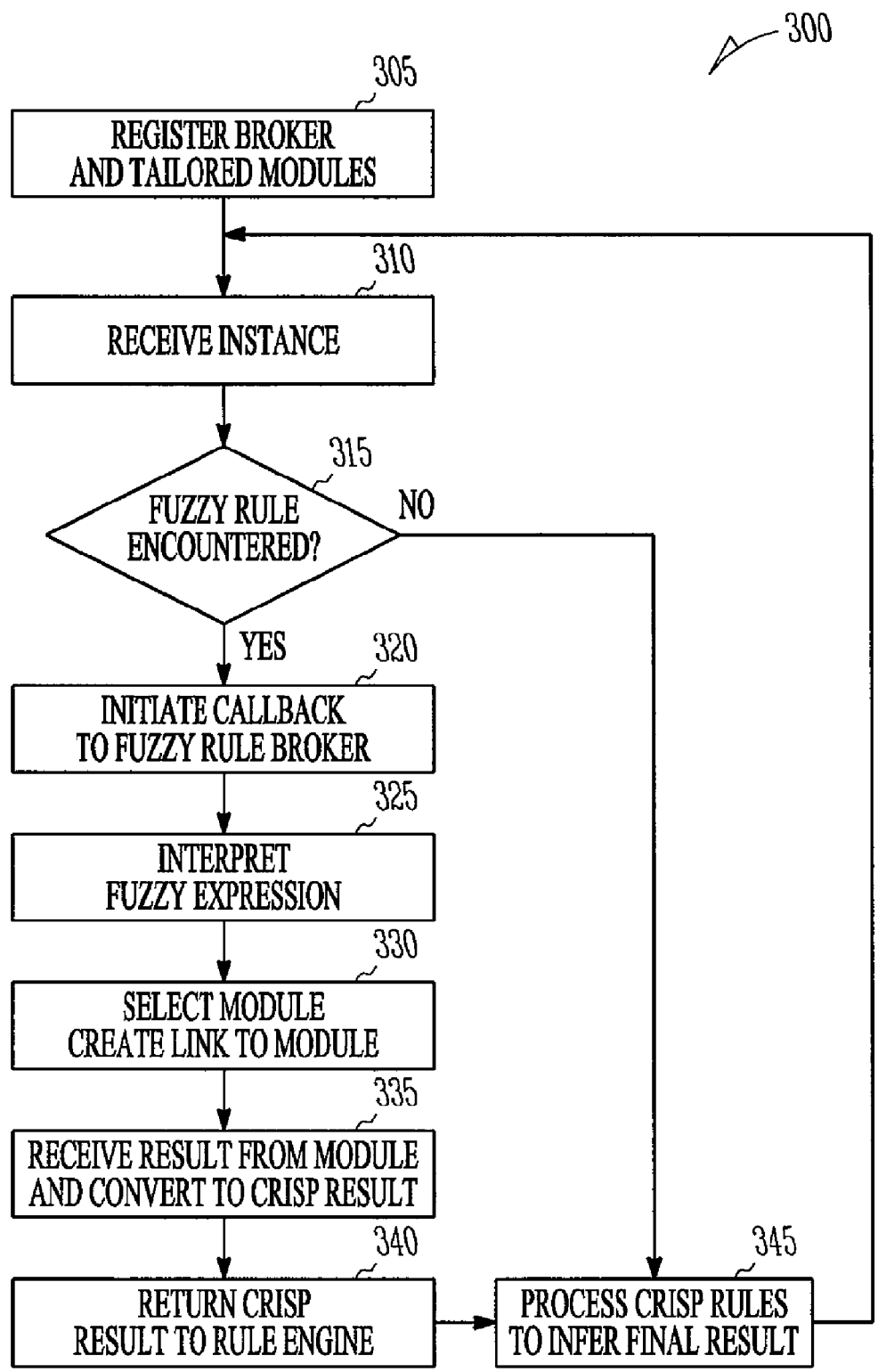
FIG. 3 is a flowchart illustrating a method of processing crisp rules and delegating fuzzy rule processing according to an example embodiment.

FIG. 3 is a flowchart illustrating a computer implemented method 300 for using the compiled code from FIG. 2 on the inferencing engine to evaluate an instance or set of data provided by a user. At the beginning of inferencing, the broker may be registered at 305 with the rule engine to handle all fuzzy expression processing. Each tailored processing module may also register at 305 with the fuzzy rule broker.

In one embodiment, the data set is received at a crisp rule engine as indicated at 310. If the data set involves a fuzzy rule at 315, a callback at 320 to the fuzzy rule broker is initiated. The fuzzy rule broker interprets the expression at 325 and selects one of multiple tailored processing modules at 330 for processing the fuzzy rule. In one embodiment, a link may be cached between the fuzzy rule broker and the selected one of the multiple tailored processing modules, also at 330. In one embodiment, the result of processing the fuzzy rule is received at 335 and is converted to a crisp result, which is returned to the crisp rule engine at 340. The crisp result may be processed with crisp rules to infer a final result at 345. The rules continue to be checked at 315 to determine if a fuzzy rule is encountered during such processing of the rules by the crisp rule engine for delegation of the processing of such fuzzy rules.

In a further embodiment, the callback includes the fuzzy rule, which is used to select the processing module for processing the fuzzy rule. The processing module may use multiple data fields from the set of data. The set of data may comprise an instance containing facts. The facts may correspond to input from a user in response to a computer generated form.

As one simple example of a fuzzy rule, consider a rule, the gist of which is that old dogs get an injection of vitamins. This type of rule is a fuzzy rule, because no specific value is specified for the rule. In other words, "old" may be relative, and is not tied to specific age. A specific tailored module may evaluate the fuzzy rule in view of a dog instance, which contains a set of facts related to the dog. The module may take into consideration the age, weight, and breed of the dog, or other facts in the instance to provide an indication back to the fuzzy expression broker that the dog is old or is not old. This result is ensured to be crisp by the broker, such as by converting it to a fact—old or not old, and returned to crisp rule engine for further use in evaluating more rules, or directly returning the result in various embodiments, and depending on the rules that have been compiled.

In further embodiments, different markers or delimiters may be used to identify fuzzy rules. Further, rules may be interpreted as opposed to compiled in further embodiments. Many other variations may occur to those of skill in the art. Other forms of delegating processing of fuzzy rules, still referred to as a callback, may be used, such as forms of process to process communication, exceptions, and messaging. The use of a generic operation code or similar construct, along with the markers, enables support for fuzzy rules to be accounted for in inference engines and their compilers or code interpreters with minimal changes. All fuzzy rules may be treated as a single type, with the same generic operation code used. Thus, only the markers need be recognized by the compiler, and the actual fuzzy rule may be encapsulated in the callback or other construct used to delegate processing to one of many potential tailored processing modules.

Figure 4:
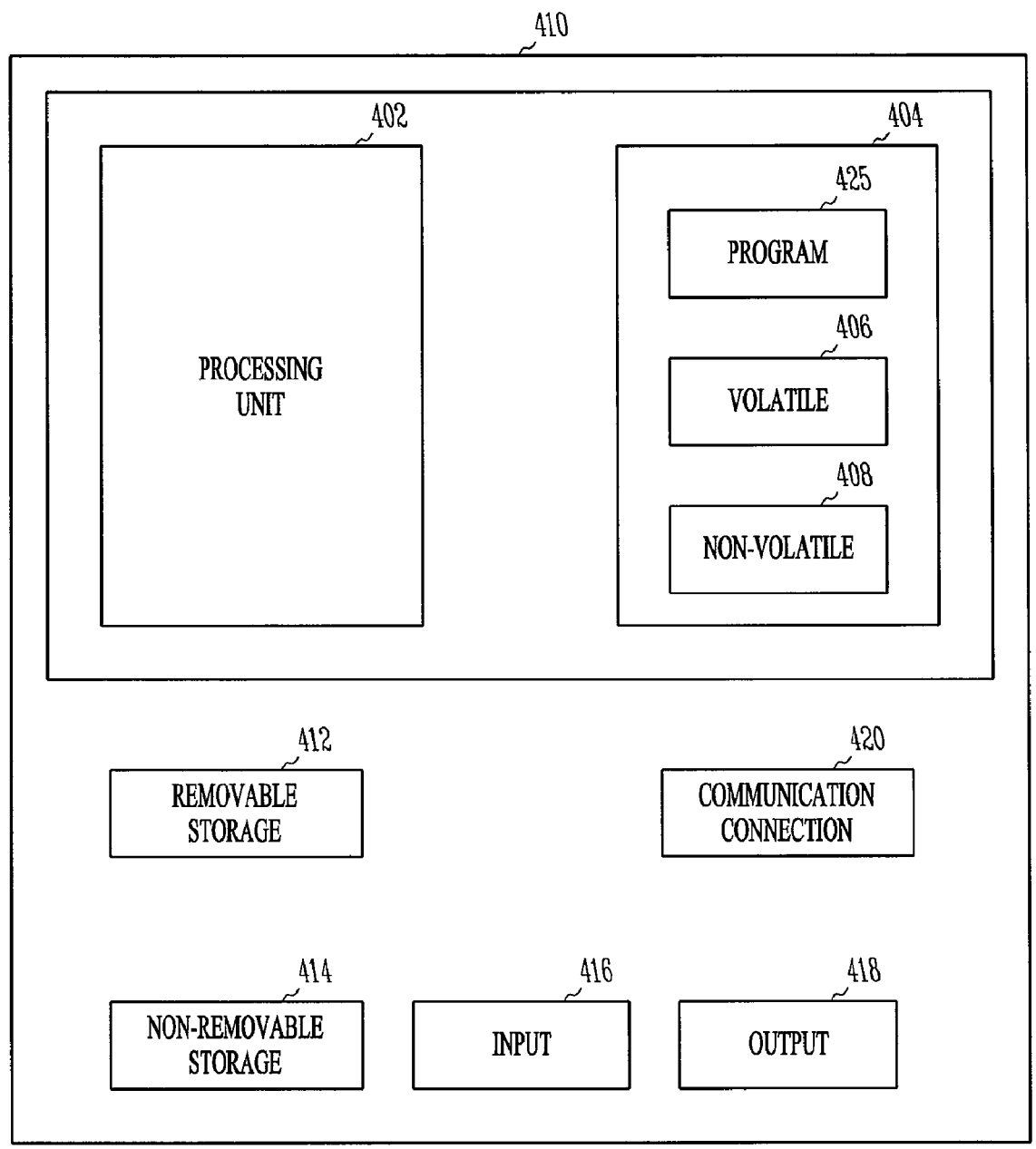
FIG. 4 is a block diagram illustrating a computer system that may be programmed in accordance with the methods described herein according to an example embodiment.

A block diagram of a computer system that may be used to implement one or more of the inferencing engine, rule broker and tailored processing modules and programming for performing the above methods is shown in FIG. 4. It should be noted that one or more such computers may be used for the various components. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
   receiving a data set at a crisp rule engine;
   if the data set involves a fuzzy rule, initiating a callback to a fuzzy rule broker;
   the fuzzy rule broker selecting one of multiple tailored processing modules for processing the fuzzy rule;
   and while compiling the data set, generating a generic fuzzy expression operation code corresponding to the fuzzy rule, wherein the fuzzy expression operation code is generic for all fuzzy expressions.

2. The computer implemented method of claim 1 and further comprising:
   converting the result of processing the fuzzy rule to a crisp result via the selected tailored processing module; and
   returning the crisp result to the crisp rule engine.

3. The computer implemented method of claim 2 and further comprising processing the crisp result and with crisp rules to infer a final result.

4. The computer implemented method of claim 1 and further comprising caching a link between the fuzzy rule broker and the selected one of the multiple tailored processing modules.

5. The computer implemented method of claim 1 wherein the callback includes the fuzzy rule.

6. The computer implemented method of claim 5 wherein the processing module for processing the fuzzy rule is selected as a function of the fuzzy rule in the callback.

7. The computer implemented method of claim 6 wherein the processing module uses multiple data fields from the set of data.

8. The computer implemented method of claim 1 wherein the set of data comprises an instance containing facts.

9. The computer implemented method of claim 8 wherein the facts correspond to input from a user in response to a computer generated form.

10. A computer implemented method comprising:
    providing a set of rules having at least one fuzzy expression to a compiler for a crisp inferencing engine, wherein the at least one fuzzy expression is bracketed between a pair of markers;
    while compiling the set of rules, recognizing the fuzzy expression;
    generating a generic fuzzy expression operation code corresponding to the fuzzy expression, wherein the fuzzy expression operation code is generic for all fuzzy expressions; and
    generating compiled code for non fuzzy expressions to create a compiled version of the set of rules.

11. The computer implemented method of claim 10 wherein the operation code generates a callback to a fuzzy rule broker.

12. The computer implemented method of claim 11 wherein the callback includes the fuzzy expression.

13. The computer implemented method of claim 11 and further comprising compiling code to process an evaluated result received from the fuzzy rule broker.

14. The computer implemented method of claim 13 wherein the evaluated result received from the fuzzy rule broker is crisp.

15. A system comprising:
    multiple tailored processing modules that process selected fuzzy expressions;
    a fuzzy expression broker that routes fuzzy expressions to the multiple tailored processing modules;
    a crisp inferencing engine that generates callbacks to the fuzzy expression broker in response to encountering a fuzzy expression when executing crisp rules intermixed with fuzzy expressions; and
    a compiler that generates a generic fuzzy expression operation code when the compiler encounters a fuzzy expression, wherein the fuzzy expression operation code is generic for all fuzzy expressions.

16. The system of claim 15 wherein the fuzzy expression broker is configured to receive results from the multiple tailored processing modules and converts the results to crisp results and send the crisp results to the crisp inferencing engine.

17. The system of claim 16 wherein the crisp inferencing engine is configured to process the crisp results with crisp rules to infer a final result.

18. The system of claim 15 and further comprising a cached link between the fuzzy expression broker and one of the multiple tailored processing modules.

19. The system of claim 15 wherein a callback includes the fuzzy rule and wherein the fuzzy expression broker selects a tailored processing module as a function of the fuzzy rule.

\* \* \* \* \*